United States Patent [19]

Kinson

[11] 4,405,739

[45] Sep. 20, 1983

[54] POLYPHENYLENE ETHER RESINS AND COMPOSITIONS HEAT STABILIZED WITH PHOSPHITE COMPOUNDS

[75] Inventor: Philip L. Kinson, Rexford, N.Y.

[73] Assignee: General Electric Company, Pittsfield, Mass.

[21] Appl. No.: 322,225

[22] Filed: Nov. 17, 1981

[51] Int. Cl.³ .............................................. C08K 5/52
[52] U.S. Cl. ..................................... 524/117; 524/118; 524/119; 524/143; 524/147; 524/151
[58] Field of Search .................. 524/117, 119; 525/132

[56] References Cited

U.S. PATENT DOCUMENTS

| | | | |
|---|---|---|---|
| 2,834,798 | 5/1958 | Hechenbleikner et al. | 524/117 |
| 2,952,701 | 9/1960 | McConnell et al. | 524/119 |
| 3,056,824 | 10/1962 | Hecker et al. | 260/937 |
| 3,257,357 | 6/1966 | Stamatoff | 528/215 |
| 3,257,358 | 6/1966 | Stamatoff | 528/215 |
| 3,306,874 | 2/1967 | Hay | 528/215 |
| 3,306,875 | 2/1967 | Hay | 528/215 |
| 3,383,435 | 5/1968 | Cizek | 525/132 |
| 3,639,334 | 2/1972 | Holoch | 524/146 |
| 3,639,656 | 2/1972 | Bennett et al. | 528/215 |
| 3,642,699 | 2/1972 | Cooper et al. | 528/215 |
| 3,660,531 | 5/1972 | Lauchlan et al. | 528/215 |
| 3,733,299 | 5/1973 | Cooper et al. | 528/215 |
| 3,737,485 | 6/1973 | Hechenbleikner | 260/982 |
| 3,838,102 | 9/1974 | Bennett et al. | 528/486 |
| 3,943,191 | 3/1976 | Cooper et al. | 525/68 |
| 3,959,211 | 5/1976 | Cooper et al. | 524/508 |
| 3,974,235 | 8/1976 | Cooper et al. | 524/141 |
| 4,088,709 | 5/1978 | Seymour et al. | 524/131 |
| 4,101,503 | 7/1978 | Cooper et al. | 524/141 |
| 4,101,504 | 7/1978 | Cooper et al. | 524/141 |
| 4,101,505 | 7/1978 | Cooper et al. | 524/141 |
| 4,102,850 | 7/1978 | Cooper et al. | 524/141 |
| 4,167,507 | 9/1979 | Haaf | 525/92 |
| 4,172,929 | 10/1979 | Cooper et al. | 521/139 |
| 4,189,411 | 2/1980 | Haaf | 524/270 |
| 4,196,117 | 4/1980 | Spivack | 524/117 |

*Primary Examiner*—John Kight, III
*Assistant Examiner*—R. A. White
*Attorney, Agent, or Firm*—Hedman, Casella, Gibson, Costigan & Hoare

[57] ABSTRACT

Polyphenylene ether resins and compositions of such resins in admixture with certain specific phosphite thermal oxidative stabilizers are described. These blends can be used with or without impact modifiers. As an additional benefit, the resins and compositions possess good melt flow properties which facilitates processing during molding.

9 Claims, No Drawings

POLYPHENYLENE ETHER RESINS AND COMPOSITIONS HEAT STABILIZED WITH PHOSPHITE COMPOUNDS

BACKGROUND OF THE INVENTION

The term "polyphenylene ether resin" is well known as defining a class of thermoplastic materials which possess outstanding physical properties, including hydrolytic stability, dimensional stability and excellent dielectric characteristics. Methods of preparation are known in the art and described in the patent literature, e.g., Hay, U.S. Pat. Nos. 3,306,874 and 3,306,875 and Stamatoff, U.S. Pat. Nos. 3,257,357 and 3,257,358. Other patents which show the preparation of polyphenylene ether resins include Bennett and Cooper, U.S. Pat. Nos. 3,369,656 and 3,838,102, as well as Cooper and Bennett, U.S. Pat. Nos. 3,642,699, and 3,733,299.

A shortcoming of such thermoplastic materials is that they are thermally unstable at elevated temperatures considerably above room temperature, and even at lower temperatures upon prolonged exposure. As a result, the polymer can undergo oxidation and degradation when extruded or molded, as indicated by a tell-tale yellowish tinge. This imparts an unsightly appearance to the extruded or molded article and can adversely affect mechanical properties as well.

It is known that the thermal oxidative stability of polyphenylene ether resins can be improved by including certain stabilizers with the resin. One such stabilizer is diphenyl decyl phosphite. See also U.S. Pat. No. 2,952,701.

A continuing need exists for ways of improving the thermal oxidative stability of polyphenylene ether resins and compositions containing such resins.

INTRODUCTION TO THE INVENTION

It has now been discovered that certain narrowly defined phosphite compounds are more effective thermal oxidative stabilizers for polyphenylene ether resins and resin compositions, on a weight for weight basis, than diphenyl decyl phosphite (hereinafter also referred to as "DPDP"). In addition, the stabilized resins and compositions of this invention exhibit better melt flow properties than their DPDP modified counterparts.

The thermal oxidative stabilizers of this invention are selected from compounds having the following formulae:

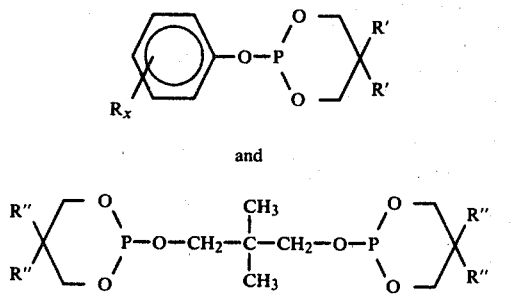

and

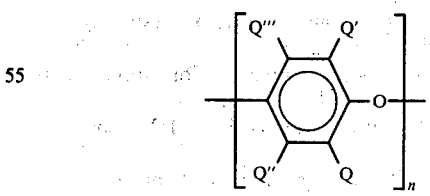

In the above formulae, x is 0 or an integer of 1 to 5 representing the number of substituents on the benzene ring; R is independently hydrogen, alkyl, especially alkyl having 1–10 carbon atoms, for example, methyl, ethyl, propyl, butyl, pentyl, hexyl, heptyl, octyl, nonyl, decyl; hydroxyl; or halogen, for example, chloro, bromo or fluoro; and R' and R" are independently hydrogen or (lower) alkyl having from 1 to 6 carbon atoms.

DESCRIPTION OF THE INVENTION

The stabilizing phosphite compounds employed in this invention are commercially available or can be prepared by following procedures described in the literature, for example, U.S. Pat. No. 3,056,824 to Arthur C. Hecker, et al.

The compounds of formula I can be made, for instance, by reacting a straight or branched chain aliphatic diol, e.g., 1,3-propanediol, 1,3-isobutanediol, neopentyl glycol, etc., with triphenyl phosphite by heating in the presence of an alkaline catalyst, e.g., an alkali metal, alkaline earth metal or metal alcoholate. The reaction proceeds essentially as a substitution reaction, with an aliphatic group replacing one or more aryl groups in the triaryl phosphites. The proportions of the aliphatic alcohol and triaryl phosphite are selected accordingly. Thus there is used 1 mole of aliphatic diol to replace 2 moles of aryl radicals from the original phosphite, with the liberation of 2 moles of phenol. Reaction temperatures may vary widely but in general are between about 120° and 150° C.

In practice, the dihydric alcohol, triphenyl phosphite ester and catalyst may be mixed together in any desired order, preferably before heating is started. The materials are then heated together, as, for example, under a reflex condenser, until the substitution of aliphatic for aryl components has reached the desired state. This can be determined by no further change in observable properties such as the boiling point of the mixture. The period of heating required is usually 2–5 hours. Heating is then discontinued. The phenol or other arylhydroxy compound liberated during the reaction as well as any unreacted aliphatic diol are distilled off in vacuo, and the resultant phosphite triester is recovered from the still residue and purified by conventional means.

In this manner there are prepared by way of illustration, the phenyl, cresyl, xylyl, mesityl, nonylphenyl and chlorophenyl esters of neopentyl glycol phosphite, 1,3-propanediol phosphite and 1,3-isobutanediol phosphite.

The compounds of formula II can be prepared by reacting the compound of formula I with neopentyl glycol in an approximate molar ratio of 2:1 under the conditions described above.

The stabilizer compounds are preferred for use with polyphenylene ether resins which are homopolymers and copolymers having the formula

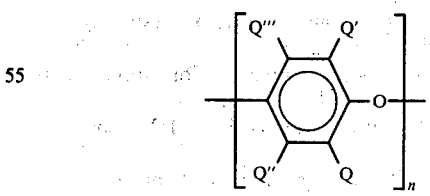

wherein Q, Q', Q" and Q''', are independently selected from the group consisting of hydrogen, hydrocarbon radicals, halohydrocarbon radicals having at least two carbon atoms between the halogen atom and the phenol nucleus, hydrocarbonoxy radicals and halohydrocarbonoxy radicals having at least two carbon atoms between the halogen atoms and the phenol nucleus, and Q', Q" and Q''' in addition may be halogen with the proviso that Q and Q' are preferably free of a tertiary carbon atom; and n represents the total number of monomer residues and is an integer of at least 50.

Especially preferred is poly(2,6-dimethyl-1,4-phenylene) ether.

These can be prepared by following well known procedures such as those set forth in the patents referred to above.

The compositions of the invention can also comprise polyphenylene ether resins in admixture with alkenyl aromatic resins as defined by Cizek, U.S. Pat. No. 3,383,435, and other thermoplastic elastomers conventionally used as auxiliary or modifying resins. These are employed to improve the impact resistance of articles molded from the mixtures.

As is described in the Cizek patent, modifiers such as polybutadiene may be incorporated into the alkenyl aromatic resins to improve the properties of resultant compositions. Other such modifiers are also known. These include block and hydrogenated block copolymers such as are described in U.S. Pat. No. 3,660,531 to Lauchlan et al. or U.S. Pat. No. 4,167,507 to Haaf. Similarly, graft-modified polymers are described in U.S. Pat. Nos. 3,943,191; 3,959,211; 3,974,235; 4,101,503, 4,101,504; 4,101,505; and 4,102,850 to Glen D. Cooper et al. All of these modified polyalkenyl aromatic resins are also within the scope of the present invention.

Specific examples of alkenyl aromatic monomers include stryene, chlorostyrene, alpha-methylstyrene, bromostyrene, vinyl xylene, divinylbenzene and vinyl naphthalene. Styrene is particularly preferred.

The term "styrene resin" as used broadly throughout this disclosure includes, by way of example, homopolymers such as polystyrene and polychlorostyrene, as well as polystyrenes which have been modified by natural or synthetic rubber, e.g., polybutadiene, polyisoprene, butyl rubber, EPDM rubber, ethylene propylene copolymers, natural rubber, polysulfide rubbers, polyurethane rubbers, epichlorohydrin, acrylic rubber; styrene containing copolymers such as styrene-acrylonitrile copolymers (SAN), styrene-butadiene copolymers, styrene-maleic anhydride copolymers, styrene-acrylonitrile-butadiene terpolymers (ABS), poly-alpha-methylstyrene, copolymers of ethylvinylbenzene and divinylbenzene, and the like; block copolymers of the A-B-A and A-B type wherein A is polystyrene and B is an elastomeric diene, e.g., polybutadiene, radial teleblock copolymers of styrene and a conjugated diene, acrylic resin modified styrenebutadiene resins and the like, and blends of homopolystyrene and copolymers of the aforementioned types.

The polyphenylene ether and modifying resin, e.g., polyalkenyl aromatic resin, may be present in virtually any proportion in the present blends. For optimum physical properties in the blend, however, they are preferably in a weight ratio of from 20:1 and 1:2, respectively.

To be effective the stabilizer compounds (Formulae I and II above) should be present in amounts of at least about 0.1 part based on the total weight of resins in the compositions. Best results are normally achieved using amounts in the range between about 0.5 and 10 parts, most preferably 0.5 to 1 part by weight of the total resin weight.

The stabilizer compounds can be used individually or in combination, alone or together with conventional antioxidants.

The molding compositions can also contain one or more of the supplementary non-resinous agents which have heretofore been customarily present in polyphenylene ether resin molding compositions to improve certain other physical and chemical properties of the moldings. These agents include flame retardants, plasticizers, strengthening fibers (for example, glass fibers and graphite whiskers), mineral filler, abrasion resistant components, dyes, and pigments. Many of such agents are disclosed in said U.S. Pat. No. 4,172,929 to Cooper et al.

The supplementary non-resinous agents are present in total amount between 1% and 50%, so as to provide their customary benefits.

The manner in which the present compositions are prepared is not critical. In one procedure, a blend premix is formed by tumbling the ingredients. The blend premix is passed through an extruder at an elevated temperature, e.g., from about 400° to about 750° F., dependent on the needs of the particular composition. The extrudate is cooled and chopped into pellets and the pellets are molded into any desired shape.

The following examples are given by way of illustration only and are not intended as a limitation on the scope of this invention. Unless otherwise specified herein, all proportions are provided on a weight basis.

EXAMPLE

The compositions shown in Table I below were prepared by dry blending the ingredients in a Henschel mixer, extruding the blend at 550° F. on a 28 mm Werner-Pfleiderer twin screw extruder, cutting the extrudate into pellets and injection molding into test specimens at 525° F. The molded pieces were tested for the properties noted below using standard procedures.

TABLE I

Compositions and Physical Properties of Blend Containing Phenyl Neopentylene Glycol versus Control

| | Parts by Weight | |
|---|---|---|
| | 1 | 1A* |
| Ingredients, Parts by Weight | | |
| Poly(2,6-dimethyl-1,4-phenylene) ether resin (PPO, General Electric Co.) | 50 | 50 |
| Rubber modified high impact polystyrene (Foster Grant's 834, containing about 9% polybutadiene) | 50 | 50 |
| Polyethylene | 1.5 | 1.5 |
| Decyl diphenyl phosphite (Argus) | — | 1 |
| Phenyl neopentylene glycol phosphite (NP-80, Argus Chemical Corp.) | 1 | — |
| Tri(isopropylphenyl) phosphates (Kronitex 50, FMC Corp.) | 3.5 | 3.5 |
| Titanium dioxide | 3.0 | 3.0 |
| Zinc oxide | 0.15 | 0.15 |
| Zinc sulfide | 0.15 | 0.15 |
| Properties | | |
| Flow channel length, inches | 20.2 | 18.7 |
| Yellowness index | 18.1 | 22.7 |
| Notched Izod impact strength, ft. lbs./in. n. | 3.1 | 3.2 |
| Tensile strength, psi | 10,800 | 10,600 |
| Elongation, % | 80 | 76 |
| Gardner impact strength, in. lbs. | 200 | 200 |

TABLE I-continued

| Compositions and Physical Properties of Blend Containing Phenyl Neopentylene Glycol versus Control | | |
| --- | --- | --- |
| | Parts by Weight | |
| | 1 | 1A* |
| Heat distortion temp., °F. | 254 | 253 |
| UL-94 flame test | V-1 | V-1 |

It can be seen that composition 1, containing NP-80 phosphite, possesses better thermal stability, as indicated by a lower yellowness index, and better flow, as indicated by a longer channel flow length.

All of the foregoing patents and/or publications are incorporated herein by reference. Obviously, other modifications and variations of the present invention are possible in light of the above teachings. For instance, instead of poly(2,6-dimethyl-1,4-phenylene) ether, there can be used a copolymer such as poly(2,6-dimethyl-co-2,3,6-trimethyl-1,4-phenylene) ether. The compositions can also include other ingredients such as other impact modifiers, drip retardants, reinforcements and/or fillers, antioxidants, coloring agents, pigments. It is, therefore, to be understood that changes may be made in the particular embodiments of the invention described which are within the full intended scope of the invention as defined by the appended claims.

I claim:

1. A thermoplastic composition which comprises an intimate admixture of a polyphenylene ether resin with an effective amount of a thermal oxidative stabilizing agent selected from among compounds having the formula:

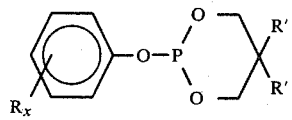

in which x is 0 or an integer of from 1 to 5 representing the number of substituents on the phenyl ring; R is independently hydrogen, alkyl having 1 to 10 carbon atoms, halogen or hydroxyl; and R' is independently hydrogen, or (lower) alkyl having from 1 to 6 carbon atoms.

2. A composition according to claim 1, in which the stabilizing compound is present in an amount of from about 0.1 to about 10 parts by weight based on the total amount of resin.

3. A composition according to claim 1 which also includes an alkenyl aromatic resin.

4. A composition according to claim 3, in which the alkenyl aromatic resin is a styrene resin.

5. A composition according to claim 4, in which the ratio of polyphenylene ether and styrene resin is from 20:1 and 1:2, respectively, on a weight basis.

6. A composition according to claim 4, in which the polyphenylene ether is poly(2,6-dimethyl-1,4-phenylene ether).

7. A composition according to claim 4, in which the styrene resin is a rubber modified high impact polystyrene.

8. A composition according to claim 1, which also contains one or more additives selected from among flame retardants, plasticizers, fillers, reinforcements, and coloring agents.

9. A composition according to claim 1, in which the stabilizing agent is phenyl neopentylene glycol phosphite.

* * * * *